UNITED STATES PATENT OFFICE.

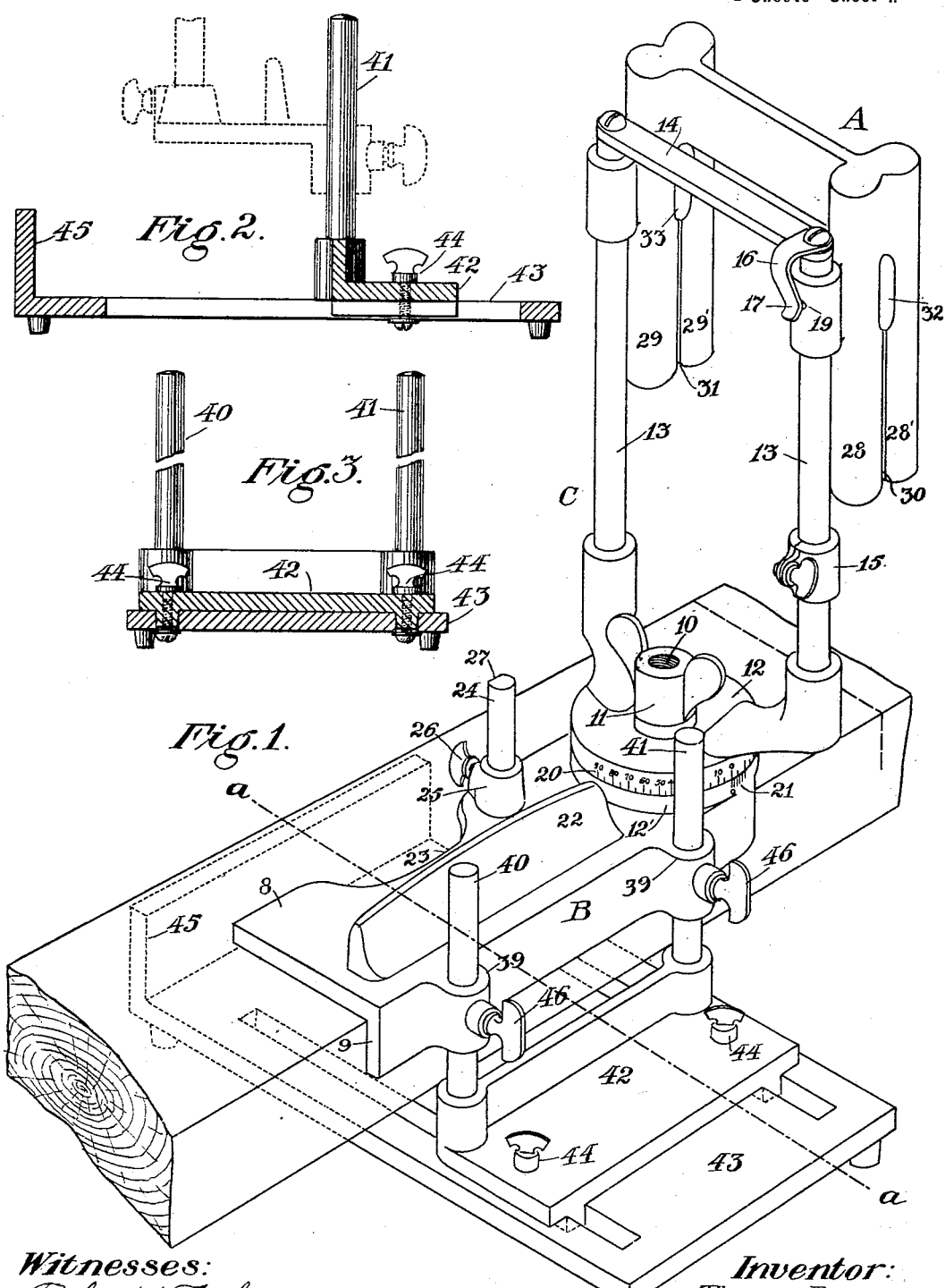

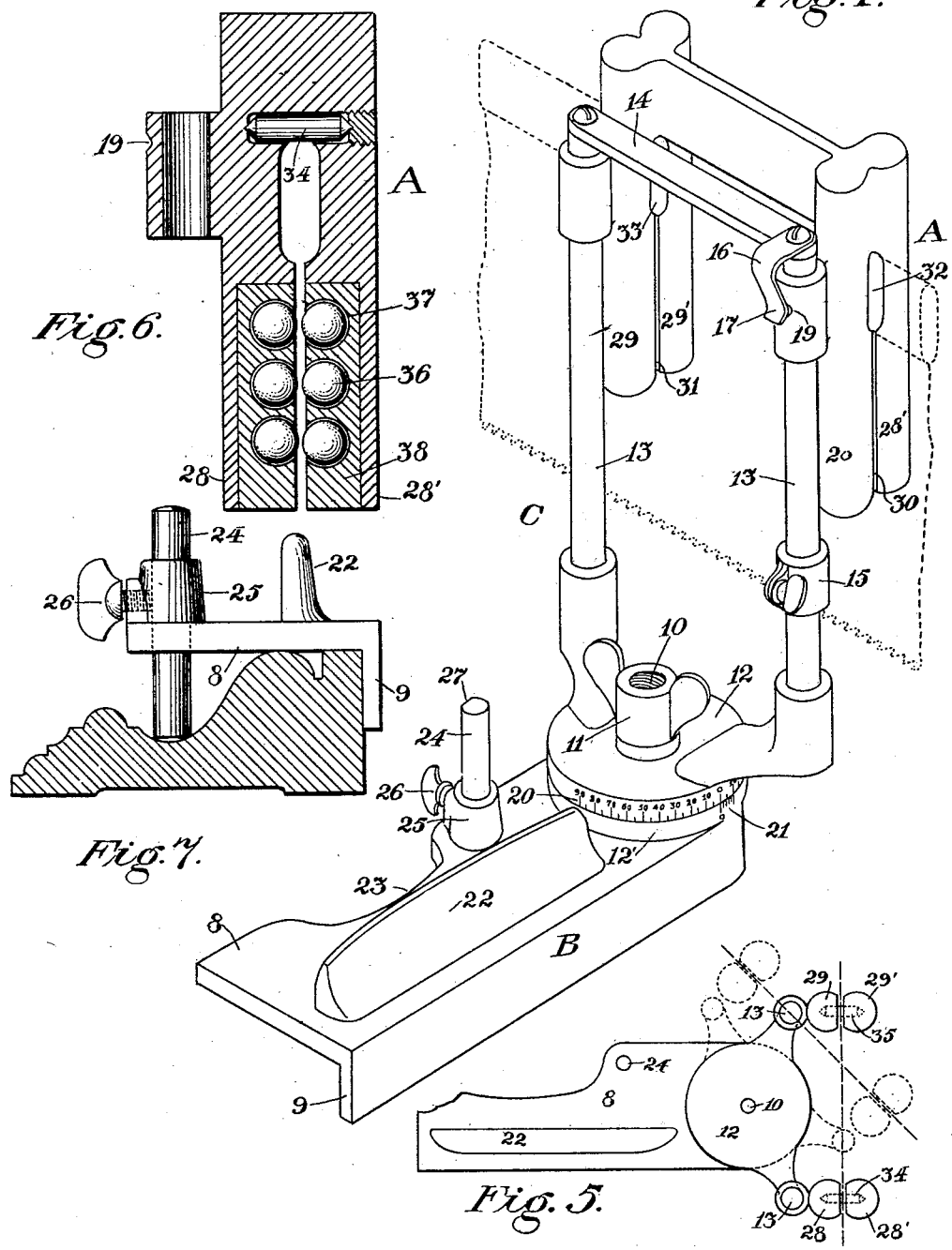

THOMAS PRENTICE, OF NEW BRITAIN, CONNECTICUT.

SAW-GUIDE.

SPECIFICATION forming part of Letters Patent No. 703,085, dated June 24, 1902.

Application filed January 24, 1902. Serial No. 91,035. (No model.)

*To all whom it may concern:*

Be it known that I, THOMAS PRENTICE, a citizen of the United States, residing in New Britain, in the county of Hartford and State of Connecticut, have invented certain new and useful Improvements in Saw-Guides, of which the following is a specification.

This invention relates to saw-guides, and has for its object to provide improved mechanism for constraining and guiding a saw for determining its angle or depth of cut.

Another object of the invention is to provide a miter or bevel guide which may be applied to the top of the work.

Another object of the invention is to provide mechanism for readily and accurately adjusting the angle or depth of cut of a saw.

The present improvement is intended for use in place of the present saw-guide "miter-box" and is adapted for use in the miter or bevel sawing of moldings or other kinds of stock or material wherever it is desired to control the position of the saw in an accurate manner, and especially where it is desired to vary the angle at which the saw-cut is to be made and to control the depth of such cut.

One feature in my present improvement relates to the manner in which the device is applied to the work. In this respect the present device may be said to operate in a manner directly opposite to the miter-box, since in that case the work is ordinarily contained in the box while it is being operated upon. In my improved saw-controlling apparatus the saw-guide and the means for carrying and regulating the operation of the same are supported in the form of the apparatus herein illustrated upon a base-piece or holder, which may be, as regards certain features of my improvement, of any suitable construction.

The base of the device may be furnished with a projecting rib or flange by which the workman can grasp the base parts, thereby to hold the same in a fixed position on the work to be sawed. By thus holding the device in place on the work (instead of putting the work into the saw-controlling device, as in a miter-box,) the device itself can be quickly handled and shifted from place to place and when a saw cut has been completed can be instantly laid aside without moving the work.

This permits of the convenient and effective use of the saw-controlling device on many kinds of work which could not be done by the aid of a miter-box or a controlling device of that class and in which it is frequently required to make saw cuts in different angular positions.

Another feature of my improved saw-controlling device, relating more especially to the use of the same on moldings or other irregular pieces, consists of an adjustable support whereby the controller may be held in proper vertical or angular position. For this purpose the base is provided with an adjustable part adapted to move up and down, so as to bear upon a relatively low portion of the bar or piece of work to which the device is applied. Usually this adjustable piece may consist of a round rod of proper length for covering the required length of work. A suitable clamping device may be provided for holding the adjustable support after the same has been set in proper position. In some cases, however, it is desirable to have a saw-guide not only adapted for portable use, but also for use in the shop or on the bench in working upon pieces that can best be held in place by supporting the same in a fixture or framework. For this purpose I provide in some cases additional guides, upon which the saw-guide may be mounted and be movable for application to the top and side of the work, and a positioning-stop for the bottom and opposite side of the work, whereby the positioning of the saw will be positively controlled by the face of the work upon which the saw cut is to be made.

The guide may be so organized that it will follow the saw and exert a constant control upon the same.

In the drawings accompanying and forming part of this specification, Figure 1 is an isometric projection in outline of a form of my invention shown as applied to a piece of work. Fig. 2 is a sectional view on the line *a a* of Fig. 1. Fig. 3 is a sectional view in a direction transverse to the section-line of Fig. 2. Fig. 4 is an isometric projection of a form of the improved guide adapted for manual control. Fig. 5 is a diagrammatic plan view of Fig. 4 on a reduced scale. Fig. 6 is an enlarged sectional detail view of a part of Fig. 4; and Fig. 7 is a section in the region of the contour gage, showing the device applied to a piece of molding.

In the form of my invention herein shown the saw-guide (designated in a general way by A) is mounted upon a positioning base portion, (designated in a general way by B,) the base portion serving to locate the device upon the work and the guide to determine the direction of cut of the saw.

The base-piece is shown as consisting of a plate 8, furnished with a rib or side stop 9, that may be formed integrally therewith. For the purpose of rendering the device adjustable to various angles the base is provided with an adjustable frame, (designated in a general way by C,) upon which is supported the saw-guide A, the frame being secured in place in any desired position by means of some suitable clamping device—as, for instance, the bolt or stud 10, furnished with a thumb-screw or binder 11. If preferred, however, other suitable means may in some cases be substituted for the bolt and clamping-nut herein shown.

The guide-frame C is shown as comprising a base portion 12, provided with a guide or guides of suitable character for supporting the saw-guide A in such manner that it may move down with the saw during the progress of the saw cut and the control thereof be constant. Said guide-frame is preferably made by forming or attaching to the base portion thereof one or more guides or rods 13, (in the present instance two,) which are located at some distance apart and upon which the saw-guide is fitted to slide up and down freely and closely. The tops of said guides or rods 13 are shown connected by a cross-bar 14, rigidly fixed at its ends to the ends of the said guide-rods, thereby assisting in properly holding said rods in accurate alinement and at the same time serving as a stop for limiting the upward movement on the slides of the saw-guide. Said slides are preferably shown as sleeves embracing the guide-rods. (See Figs. 1 and 4.) For limiting the downward movement of the slides a stop-collar 15 is shown adjustably fixed on one of said guide-rods. In some cases, if desired, a similar stop may be provided for each of said guide-rods; but in ordinary practice one such stop limiting the downward movement of the guide-frame is deemed sufficient. When the saw-guide is in its upward position, it is sometimes necessary for convenience in working to lock the same or otherwise securely hold the said guide in such elevated position, and for which purpose I may employ a detent fixed to one of said main parts and located and adapted for engaging with the other of said main parts, thus effecting the desired check. In the present instance I have shown said detent in the form of a spring 16, held in place by fixing the same to the top of the guide-frame and having a projecting point 17, adapted to bear firmly against a portion of the saw-guide, and thus hold the said guide in the desired position. Also in some cases I make a depression 19 in the said saw-guide, whereby the detent device will positively interlock with said guide, and thus hold the same in a more secure manner. Other means for maintaining the guide in an upright position may be employed to positively lock the guide in its upward position and only be released therefrom when the operator forcibly disengages the same from the guide.

For the purpose of enabling the workman to readily and quickly set the guide-frame to the proper angle the base 12 of the frame may be made circular throughout a considerable part of its circumference, or, as shown in the present instance, its circular part may be an entire circle. The seat 12', on which the said frame is supported, may also be of circular form and suitable graduations made thereon—as, for instance, a scale 20 of degrees of the circle and a zero-point and vernier 21 in about the manner indicated in Figs. 1 and 4—by means of which to accurately set the guide-frame in any desired position. The base B is shown as provided with a rib or grip 22, by which the workman may securely hold the device upon the work and remove the same therefrom when the cut is finished, and when he is using it as a hand-tool it will serve similar purposes. The base-plate 8 may be cut away, as at 23, to permit the fingers of the workman engaging the work, his thumb taking hold of the flange and some of his fingers, by means of the cut-away portion, grasping the work. For the purpose of enabling the device to be used upon work or irregular surface an adjustable contour gage or support may be provided on the base portion, and in the present instance comprises a leg 24, traversing a boss 25 and held in place by a set-screw 26. The leg may be slabbed off or flattened, as at 27, to afford a bearing or engaging face for the set-screw.

The saw-guide may be of any suitable construction adapted to receive a saw-blade and hold the same in proper alinement for use. I prefer, however, to make said guide substantially in a U-shaped form or to have the guiding-points located at some distance apart, thus to take hold of the saw-blade at points sufficiently removed for holding the blade in sufficiently accurate alinement while the same is in use. With this object in view I prefer to make said guide having two pairs of guide-arms 28 28' and 29 29', one pair of arms being at one side of the saw-blade and the other pair of arms at the other side of said blade, and between these pairs of arms are the saw-blade-receiving openings or slots 30 and 31.

In some cases it will be required to use backed saws, and for this purpose I make the saw-guide with enlarged openings 32 33 at the upper ends of said slots 30 and 31, through which enlarged openings the back of the saw may freely pass, and in some cases these openings will be made to fit a saw-back, so as to positively guide the same thereby.

For carrying the weight of the saw-guide on the saw-blade with a minimum of wear or injury thereto I have provided the vertical movable saw-guide with rollers 34, located in position for bearing on the upper edge of the saw, and thus receiving the pressure due to the weight of the saw-guide, this being from a slide downward upon the aforesaid vertical guides.

For reducing the friction at the sides of the saw-blades I have shown each of said guide-arms 28 28' 29 29' as provided with a plurality of rollers, preferably in the form of balls 36, contained in suitably-formed spaces 37, made within said guide-arms, the spaces 37 being preferably made in pieces 38, which upon being provided with balls may then be inserted into the guide-arms, which for such purpose may be made tubular. One side of each roller or ball will extend slightly beyond the inner face of the arm in which it is carried, and thus furnish effective means for sustaining the friction due to the back-and-forth movement of the saw-blade, at the same time reducing the resistance which would otherwise be offered by the friction between the guide-arms and the saw-blade.

For use as an antifriction device in saw cuts I find that a hardened-steel ball is particularly effective, for the reason that by gradually shifting its position the ball affords a large amount of wearing-surface that is, in a sense, constantly renewed, thus distributing the wear due to the friction of the saw-blade over a large area notwithstanding the ball may not revolve rapidly, the conditions prevailing in this class of work being somewhat different than those existing in ordinary "ball-bearings" as used for revolving supported journals.

By reason of my improved saw-guiding device being carried by a base or frame that is applied to the work as above set forth rather than the work being supplied in the piece the device as a whole is particularly portable and also can be made of very light weight as compared with devices in ordinary use for miter-sawing, and accordingly the workman can readily use my improved device on work in a building or in other cramped locations. Thus my present improvement meets an important question in a very practical and effective manner. For use in the shop the device may be provided with guides 39 on the said base portion 8 of the saw-guiding device, which additional guides are adapted to receive corresponding guide-rods 40 and 41, that are shown supported in an adjustable block or bracket 42, carried on a table 43, that constitutes and forms a base corresponding in a way with the usual bottom plate of a miter-box. The said bracket 42 may be adjustable on said table 43, it being held in place by a suitable clamping device—as, for instance, by binding-screws 44. At the opposite side of said table 43 is a wall or stop 45. A piece of work being laid on the table 43 against the wall 45 and the bracket 42 being suitably adjusted on said table, the plate 8 may then be lowered onto the work, so this will be held between and within the positively-disposed angles formed by the table 43 and wall 45 of the said guide-frame and the plate 8 and stop 9, thus holding the work with ample security and at the same time supporting the guide in a desirable and effective manner. For clamping the base 8 in place the said additional guides 39 thereon may be provided with suitable clamps and binding devices—as, for instance, set-screws 46. By loosening these screws the saw-guiding device as a whole may be removed from the guide-rods, and thus the saw-guide be rendered adapted for independent use as a portable device in the manner already set forth. The set-screws 44 and 46, however, may be dispensed with and the plate 8 and stop 9 be positioned by the hand of the operative.

Having described my invention, I claim—

1. In a bevel-gage for saws, a base or member constructed to be directly applied to the upper surface of the work to be operated upon, and a guide supported by the base for controlling the direction of cut of the saw, said base being notched or cut away at the edge and provided on its upper surface with a longitudinal rib adapted to be grasped by the hand of the operator to hold the structure to the work.

2. In a bevel-gage for saws, a base constructed on its lower face to be directly applied to the upper surface of the work operated upon, a guide-frame comprising upstanding rods mounted at an end of the base on the top face thereof, and a saw-guide slidably supported on the rods and overhanging the base at such end.

3. In a bevel-gage for saws, a base constructed on its lower face to be directly applied to the upper surface of the work operated upon, a guide-frame comprising upstanding rods mounted at one end of the base on the top face thereof, a saw-guide slidably supported on the rods and overhanging the base at such end, and means connecting said rods for limiting the upward movement of said saw-guide.

4. In a bevel-gage for saws, a base constructed on its lower face to be directly applied to the upper surface of the work operated upon, a guide-frame comprising upstanding rods mounted at an end of the base on the top face thereof, a saw-guide slidably supported on the rods and overhanging the base at such end, and means on one of the rods for limiting the downward movement of said saw-guide.

5. In a bevel-gage for saws, a base constructed on its lower face to be directly applied to the upper surface of the work operated upon, a guide-frame comprising upstanding rods mounted at an end of the base on the top face thereof, a saw-guide slidably supported on the rods and overhanging the base at such end, and means for engaging said saw-guide in its uppermost position.

6. In a bevel-gage for saws, a base or member constructed on its lower face to be directly applied to the upper surface of the work operated upon, a rotatable guide-frame comprising upstanding rods mounted at an end of the base on the top face thereof, means for securing the frame in different positions, a saw-guide slidably supported on the rods and overhanging the base at such end, and means connecting the rods limiting the upward movement of said saw-guide.

7. In a bevel-gage for saws, a base or member constructed on its lower face to be directly applied to the upper surface of the work operated upon, and provided with a substantially circular seat at an end of the same on the top face thereof, a guide-frame comprising a circular graduated plate having axial adjustment on said seat and provided with upstanding rods, and a saw-guide slidably supported on the rods and overhanging the base at the end thereof before mentioned.

8. In a bevel-gage for saws, a base constructed on its lower face to be directly applied to the upper surface of the work operated upon, a guide-frame comprising upstanding rods mounted at an end of the base on the top face thereof, a saw-guide slidably supported on the rods and overhanging the base at such end, a table, and means for holding the table and base spaced apart to receive the work between them.

9. In a bevel-gage for saws, a base constructed on its lower face to be directly applied to the upper surface of the work operated upon, a guide-frame comprising upstanding rods mounted at an end of the base on the top face thereof, a saw-guide provided with antifriction devices for a saw and overhanging the base at the end mentioned and means connecting the upper ends of the rod for limiting the upward movement of said saw-guide.

10. In a bevel-gage for saws, the combination with a base for sustaining the work, of a wall for engaging a surface of the work and constituting a stop therefor; a member carried by the base and embodying a plate for resting upon the work, and a rib upon the member; the base, wall, plate and rib constituting stops for the work and each engaging a different surface thereof; and means for controlling a saw carried by the plate.

11. In a bevel-gage for saws, the combination with a base for sustaining the work, of a wall for engaging a surface of the work and constituting a stop therefor; a member carried by the base and embodying a plate for resting upon the work, and a rib upon the member; the base, wall, plate and rib constituting stops for the work and each engaging a different surface thereof; a standard upon the member; and a guide for a saw mounted upon the standard and capable of reciprocation thereon.

12. In a bevel-gage for saws, the combination with a base for sustaining the work, of a wall for engaging a surface of the work and constituting a stop therefor; a member carried by the base and embodying a plate for resting upon the work, and a rib upon the member; the base, wall, plate and rib constituting stops for the work and each engaging a different surface thereof; a standard upon the member; a guide for a saw mounted upon the standard and capable of reciprocation thereon; and means for adjusting the guide relatively to the member.

13. In a bevel-gage for saws, the combination with a base for sustaining the work, of a wall for engaging a surface of the work and constituting a stop therefor; a member carried by the base and embodying a plate for resting upon the work, and a rib upon the member; the base, wall, plate and rib constituting stops for the work and each engaging a different surface thereof; and means for controlling the saw carried by the plate, and embodying portions for engaging the sides of a saw to control its direction of cut and portions for engaging a part of the saw to cause the guide to follow the saw in its movement incident to its depth of cut.

14. In a bevel-gage for saws, the combination with a base for sustaining the work, of a wall for engaging a surface of the work and constituting a stop therefor; a member carried by the base and embodying a plate for resting upon the work, and a rib upon the member; the base, wall, plate and rib constituting stops for the work and each engaging a different surface thereof; means for controlling the saw carried by the plate, and embodying portions for engaging the sides of a saw to control its direction of cut and portions for engaging a part of the saw to cause the guide to follow the saw in its movement incident to its depth of cut; and a stop to limit such movement of the saw.

15. In a bevel-gage for saws, the combination with a base for sustaining the work, of a wall for engaging a surface of the work and constituting a stop therefor, a member carried by the base and comprising a plate for resting upon the work, said member having a rib, means for adjustably uniting the member with the base, said base, wall, plate and rib constituting stops for the work and each engaging a different surface thereof; a standard upon the member, and a guide for a saw mounted upon the standard and capable of reciprocating thereon.

16. In a bevel-gage for saws, the combination with a base for sustaining the work, of a wall for engaging a surface of the work and constituting a stop therefor, a member carried by the base and comprising a plate for resting upon the work, said member having a rib, means for adjustably uniting the member with the base, the said base, wall, plate and rib constituting stops for the work and each engaging a different surface thereof; a standard upon the member, a guide for a saw mounted upon the standard and capable of reciprocating thereon, and means for adjusting the guide relatively to the member.

17. In a bevel-gage for saws, the combination with a base for sustaining the work, of a wall for engaging a surface of the work and constituting a stop therefor, a member carried by the base and comprising a plate for resting upon the work, said member having a rib, means for adjustably uniting the member with the base, the said base, wall, plate and rib constituting stops for the work and each engaging a different surface thereof; and means for controlling a saw carried by the plate and embodying portions for engaging the sides of the saw to control the direction of cut thereof, and also embodying portions for engaging a part of the saw to cause the guide to move in correspondence with its depth of cut.

18. In a bevel-gage for saws, the combination with a base for sustaining the work, of a wall for engaging a surface of the work and constituting a stop therefor, a member carried by the base and comprising a plate for resting upon the work, said member having a rib, means for adjustably uniting the member with the base, the said base, wall, plate and rib constituting stops for the work and each engaging a different surface thereof; means for controlling a saw carried by the plate and embodying portions for engaging the sides of the saw to control the direction of cut thereof, and also embodying portions for engaging a part of the saw to cause the guide to move in correspondence with its depth of cut; and a stop for limiting such movement.

19. In a bevel-gage for saws; a base constructed on its lower face to be directly applied to the upper surface of the work operated upon, a guide-frame comprising upstanding rods mounted at an end of the base on the top face thereof, a saw-guide slidably supported on the rods and overhanging the base at such end, means limiting the upward movement of said saw-guide, and an adjustable contour-gage mounted at the forward part of said base.

20. In a bevel-gage for saws, a base constructed on its lower face to be directly applied to the upper surface of the work operated upon, a guide-frame comprising upstanding rods mounted at an end of the base on the top face thereof, a saw-guide slidably supported on the rods and overhanging the base at such end, a cross-bar connecting the upper ends of the rods and limiting the upward movement of said saw-guide, and a contour-gage mounted at the forward part of the base and comprising a leg and means for securing the same in adjusted positions.

21. A mitering device comprising a base adapted to engage on its under side a face and an edge of the work, and having projecting from its upper side a frame, saw-guiding devices slidable freely on said frame and arranged to overhang one end of said base so that the saw may pass from a position above the work down past the base into or through the work.

22. A mitering device comprising a base adapted to engage on its under side a face and an edge of the work, and having projecting from its upper side a pivoted frame, saw-guiding devices slidable freely on said frame and arranged to overhang one end of said base so that the saw may pass from a position above the work down past the base into or through the work.

THOMAS PRENTICE.

Witnesses:
SAMUEL H. STEARNS,
FRANK BAKER.